(12) United States Patent
Chen et al.

(10) Patent No.: US 9,569,325 B2
(45) Date of Patent: Feb. 14, 2017

(54) METHOD AND SYSTEM FOR AUTOMATED TEST AND RESULT COMPARISON

(71) Applicant: Wistron Corporation, New Taipei (TW)

(72) Inventors: Fei-Teng Chen, New Taipei (TW); Hsin-Yu Chan, New Taipei (TW)

(73) Assignee: Wistron Corporation, New Taipei (TW)

( * ) Notice: Subject to any disclaimer, the term of this patent is extended or adjusted under 35 U.S.C. 154(b) by 452 days.

(21) Appl. No.: 14/176,158

(22) Filed: Feb. 10, 2014

(65) Prior Publication Data
US 2015/0100296 A1  Apr. 9, 2015

(30) Foreign Application Priority Data

Oct. 3, 2013  (TW) .............................. 102135885 A

(51) Int. Cl.
*G06F 9/44* (2006.01)
*G06F 11/22* (2006.01)
(Continued)

(52) U.S. Cl.
CPC ........... *G06F 11/2294* (2013.01); *H04L 43/50* (2013.01); *H04L 41/069* (2013.01); *H04L 41/24* (2013.01)

(58) Field of Classification Search
CPC .............. G06F 11/3664; G06F 11/3409; G06F 11/3692; G06F 11/2294; H04L 43/50; H04L 41/069; H04L 41/24
(Continued)

(56) References Cited

U.S. PATENT DOCUMENTS 5,022,028 A * 6/1991 Edmonds ............ G06F 11/3688
714/32
5,157,782 A * 10/1992 Tuttle .................. G06F 11/3688
714/25
(Continued)

FOREIGN PATENT DOCUMENTS

CN  102998613  3/2013
TW  200705251  2/2007
(Continued)

OTHER PUBLICATIONS

Menke_4-2013 (IBM Systems Director 6.3 Best Practices Installation and Configuration, REDP-4932-00 Apr. 2013).*
(Continued)

*Primary Examiner* — Kamini S Shah
*Assistant Examiner* — Scott S Cook
(74) *Attorney, Agent, or Firm* — Jianq Chyun IP Office

(57) ABSTRACT

A method and a system for automated test and result comparison, suitable for a client computer to control a management server to test sensors in a server to be tested, are provided. In the method, an operating interface of a management program of the management server is logged in through a network, and operating actions of a user testing the sensors by using the operating interface are simulated to generate keyboard and mouse control instructions corresponding to the operating actions by using a keyboard-and-mouse automation program. The keyboard and mouse control instructions are executed to operate the operating interface, so as to control the management program to test the sensors. The test parameters obtained by the management program testing the sensors are captured, and compared with predetermined parameters in a database to obtain a test result. Finally, the test result is stored as a test file.

9 Claims, 10 Drawing Sheets

(51) Int. Cl.
*H04L 12/26* (2006.01)
*H04L 12/24* (2006.01)

(58) Field of Classification Search
USPC ........ 703/1, 2, 3, 4, 5, 6, 7, 8, 9, 10; 714/32
See application file for complete search history.

(56) References Cited

U.S. PATENT DOCUMENTS

| | | | | |
|---|---|---|---|---|
| 5,410,681 | A * | 4/1995 | Jessen | G06F 11/3672 703/27 |
| 5,598,333 | A * | 1/1997 | Marsico, Jr. | G06F 11/3414 714/38.12 |
| 5,600,789 | A * | 2/1997 | Parker | G06F 11/3688 714/38.11 |
| 5,640,537 | A * | 6/1997 | Jessen | G06F 11/3664 703/23 |
| 6,332,211 | B1 * | 12/2001 | Pavela | G06F 11/3664 702/119 |
| 7,992,046 | B2 * | 8/2011 | Yang | G06F 11/261 703/25 |
| 8,122,293 | B2 * | 2/2012 | Lee | G06F 11/2284 714/25 |
| 8,386,852 | B2 * | 2/2013 | Cohen | G06F 11/3688 714/33 |
| 9,135,151 | B2 * | 9/2015 | Betak | G06F 11/3692 |
| 2004/0082348 | A1 | 4/2004 | Gabriel et al. | |
| 2006/0167919 | A1 | 7/2006 | Hsieh | |
| 2006/0259612 | A1 | 11/2006 | De Oliveira et al. | |
| 2010/0318854 | A1 | 12/2010 | Chen | |
| 2011/0029652 | A1 | 2/2011 | Chhuor et al. | |
| 2012/0084551 | A1 | 4/2012 | Cheng et al. | |
| 2012/0254662 | A1 | 10/2012 | Chen | |
| 2014/0101640 | A1 * | 4/2014 | Romdhane | G06F 11/3684 717/125 |

FOREIGN PATENT DOCUMENTS

| | | | |
|---|---|---|---|
| TW | 200828031 | | 7/2008 |
| TW | 201019101 | | 5/2010 |
| TW | 201044169 | | 12/2010 |
| TW | 201239614 | * | 10/2012 |

OTHER PUBLICATIONS

Test Automation Defined Archived Wiki dated Oct. 1, 2013 downloaded from https://en.wikipedia.org/w/index.php?title=Test_automation&oldid=575287110.*

Qu_2011 (Test Terminal-based Applications Automatically with Rational Functional Tester: How to use the Extension for Terminal-based Applications, IBM, Sep. 13, 2011).*

Screen_scraping_2011 downloaded from ttps://web.archive.org/web/20110219074627/http://screen-scraping.softalizer.com/.*

Scientific_Method.pdf Definition of Scientific Method, Archived Wikipedia dated Jun. 7, 2012 downloaded from https://en.wikipedia.org/w/index.php?title=Scientific_method&oldid=497959712.*

"Office Action of Taiwan Counterpart Application", issued on Nov. 3, 2015, p. 1-p. 11.

* cited by examiner

```
dir_B0_01_DIMM_1_Status          /* Sensor name :DIMM 1
B0                               /* Sensor number : 0xB0
00 02 00 00                      /* Offset 00 : DIMM1 MBE
dir_B0_03_DIMM_1_Status          /* Sensor name :DIMM 1
B0                               /* Sensor number : 0xB0
00 08 00 00                      /* Offset 01 : DIMM 1 Scrub Failure
dir_B0_04_DIMM_1_Status          /* Sensor name :DIMM 1
B0                               /* Sensor number : 0xB0
00 20 00 00                      /* Offset 08 : DIMM 1 SBE
====================             /* All test have already finished
```

FIG. 5

```
Uncorrectable error detected for memory device 1 in Group 1 on Subsystem System Memory. /* Sensor name :DIMM
1 MBE Assertion event
None/* Sensor name : DIMM 1 MBE DeAssertion event
Scrub Failure for memory device 1 in Group 1 on Subsystem System Memory./* Sensor name :DIMM 1 Scrub Failure
Assertion event
None/* Sensor name : DIMM 1 Scrub Failure DeAssertion event
Memory Logging Limit Reached for memory device 1 in Group 1 on Subsystem System Memory. /* Sensor
name :DIMM 1 SBE Assertion event
None/* Sensor name : DIMM 1 SBE DeAssertion event
```

FIG. 6

| | | |
|---|---|---|
| Event Severity: | CriticalCritical | /* Sensor name :DIMM 1 MBE Assertion Severity |
| None | | /* Sensor name :DIMM 1 MBE DeAssertion Severity |
| Event Severity: | CriticalCritical | /* Sensor name :DIMM 1 Scrub Failure Assertion Severity |
| None | | /* Sensor name :DIMM 1 Scrub Failure DeAssertion Severity |
| Event Severity: | MinorMinor | /* Sensor name :DIMM 1 SBE Assertion Severity |
| None | | /* Sensor name :DIMM 1 SBE DeAssertion Severity |

METHOD AND SYSTEM FOR AUTOMATED TEST AND RESULT COMPARISON

CROSS-REFERENCE TO RELATED APPLICATION

This application claims the priority benefit of Taiwan application serial no. 102135885, filed on Oct. 3, 2013. The entirety of the above-mentioned patent application is hereby incorporated by reference herein and made a part of this specification.

BACKGROUND OF THE DISCLOSURE

Field of the Disclosure

The disclosure relates to a method and a system for automated test, and more particularly, to a method and a system for automated test and result comparison for a remote server.

Description of Related Art

A system platform management tool known as IBM Systems Director (ISD) and proposed by International Business Machines (IBM) is capable of being integrated with a management platform of a third party, so as to provide a virtual and integrated service management. ISD provides a control function at single point to a system management personnel, so that the system management personnel may optimize uses of computation and network resources to significantly reduce costs and complication in operations.

ISD further provides functions for remote testing which allow the system management personnel to connect a management server through a network, and control a baseboard management controller (BMC) of a server to be tested through the management server, so as to test and locate problems of the server to be tested for fast maintenance.

FIG. 1 is a schematic view of a conventional remote test system. Referring to FIG. 1, a remote test system 10 includes a server to be tested 12, a management server 14 and a client computer 16 connected to each other through a network 18. The server to be tested 12 includes a baseboard management controller 122 and sensors 126 disposed in the server to be tested 12. The management server 14 includes a processor 142 and a memory 144 stored with a remote control program 146. The client computer 16 includes a processor 162 and a memory 164 stored with a browser program 166. The client computer 16 is connected to a monitor 168, a keyboard 170 and a mouse 172. Therein, a user may use the browser program 166 of the client computer 16 to connect the management server 14 and activate an operating interface of the remote control program 146.

Accordingly, the user may then operate the operating interface displayed on the monitor 168 through the keyboard 170 and the mouse 172, so as to control the remote control program 146 of the management server 14 to test the sensors 126 in the server to be tested 12 in one by one manner. Therein, operations such as "clear event log", "trigger event", and "get event log" may be performed on the server to be tested 12.

However, it is a great time-consuming when a testing engineer performs a series of tests on a remote server since a test result of each of sensor events needs to be compared manually. Accordingly, it is necessary to provide a system for automated test capable of efficiently controlling the remote control program to execute testing tasks on the remote server, so as to save labor cost for the testing engineer.

SUMMARY OF THE DISCLOSURE

The disclosure is directed to a method and a system for automated test and result comparison, in which the operating actions of the user operating the operating interface of the management program is automated, and the actions such as comparing, capturing, storing the test result are performed on the test result, so as to effectively reduce the testing costs.

The method for automated test and result comparison of the disclosure is suitable for a client computer to control a management server to test sensors in a server to be tested. In the method, an operating interface of a management program of the management server is logged in through a network, and operating actions of a user testing the sensors by using the operating interface are simulated to generate keyboard and mouse control instructions corresponding to the operating actions by using a keyboard-and-mouse automation program. Next, the keyboard and mouse control instructions are executed to operate the operating interface, so as to control the management program to test the sensors through the operating interface. Then, the test parameters obtained by the management program testing the sensors are captured, and compared with predetermined parameters in a database to obtain a test result. Finally, the test result is stored as a test file.

In an embodiment of the disclosure, the step of capturing the test parameters obtained by the management program testing the sensors includes: capturing a plurality of texts on a screen of the test parameter displayed by the operating interface to obtain the test parameter.

In an embodiment of the disclosure, the screen captured by the parameter capturing module includes an event list having a plurality of test events to be executed by the management program to the sensors, and the test parameter obtained by executing each of the test events.

In an embodiment of the disclosure, the step of storing the test result as the test file includes storing the screen of the test parameter displayed by the operating interface.

In an embodiment of the disclosure, before the step of capturing the test parameter obtained by the management program testing the sensors, and comparing the test parameter with the predetermined parameters in the database to obtain the test result, the method further generates a sensor configuration file suitable for an integrated management module (IMM), in which a name, a number and offsets of each of the sensors in the server to be tested are recorded in the sensor configuration file, and establishes an event log database and an event severity database in the sensor configuration file. The event log database records names of a plurality of sensor events and at least one corresponding event log. The event severity database records the names of the sensor events and at least one corresponding event severity.

In an embodiment of the disclosure, the step of capturing the test parameter obtained by the management program testing the sensors, and comparing the test parameter with the predetermined parameters in the database to obtain the test result includes reading the event log database and accordingly comparing an event name obtained by testing the sensor with the event names in the event log database, so as to obtain the test result of the event name; and reading the event severity database and accordingly comparing an event severity obtained by testing the sensor with the at least one event severity in the event severity database, so as to obtain the test result of the event severity.

In an embodiment of the disclosure, after the step of storing the test result as the test file, the method further repeats all steps above to test a rest of the sensors among the sensors, so as to obtain the test result of each of the sensors and store the test result to the test file.

The system for automated test and result comparison includes a server to be tested, a management server and a client computer. The server to be tested includes a plurality of sensors and a baseboard management controller coupled to the sensors. The management server includes a first network connecting unit, a first storage unit and a first processing unit. The first network connecting unit is configured to connect the baseboard management controller of the server to be tested through a network. The first storage unit is configured to store a management program. The first processing unit is coupled to the first network connecting unit and the first storage unit, and configured to load and execute the management program. The client computer includes a second network connecting unit, a second storage unit and a second processing unit. The second network connecting unit is configured to connect the first networking connecting unit of the management server through the network. The second storage unit is configured to store a plurality of modules. The second processing unit is coupled to the second network connecting unit and the second storage unit, configured to load and execute the modules stored in the second storage unit. The modules include an automated module, an operating module, a comparing module and a storage module. The automated module is configured to simulate a plurality of operating actions of a user testing one of the sensors in the server to be tested by using an operating interface of the management program to generate a plurality of keyboard control instructions and a plurality of mouse control instructions corresponding to the operating actions by using a keyboard-and-mouse automation program. The operating module is configured to log in the operating interface through the network, and execute the keyboard control instructions and the mouse control instructions to operate the operating interface, so as to control the management program to test the sensors. The comparing module is configured to capture at least one test parameter obtained by the management program testing the sensors, and compare the test parameter with a plurality of predetermined parameters in a database to obtain a test result. The storage module is configured to store the test result as a test file.

In an embodiment of the disclosure, the comparing module includes a parameter capturing module configured to capture a plurality of texts on a screen of the test parameter displayed by the operating interface to obtain the test parameter.

In an embodiment of the disclosure, the screen captured by the parameter capturing module includes an event list having a plurality of test events to be executed by the management program to the sensors, and the test parameter obtained by executing each of the test events.

In an embodiment of the disclosure, the storage module is further configured to store the screen of the test parameter displayed by the operating interface.

In an embodiment of the disclosure, the modules further includes a configuration file generating module configured to generate a sensor configuration file suitable for an integrated management module, and in which a name, a number and offsets of each of the sensors in the server to be tested are recorded in the sensor configuration file.

In an embodiment of the disclosure, the sensor configuration file further includes an event log database and an event severity database. The event log database is configured to record names of a plurality of sensor events and at least one corresponding event log. The event severity database is configured to record the names of the sensor events and at least one corresponding event severity.

In an embodiment of the disclosure, the comparing module reads the event log database and accordingly compares the event name obtained by testing the sensor with the event names in the event log database, so as to obtain the test result of the event name. The comparing module also reads the event severity database and accordingly compares the event severity obtained by testing the sensor with the at least one event severity in the event severity database, so as to obtain the test result of the event severity.

Based on above, in the method and the system for automated test, the operating actions of the user operating the operating interface of the management program are simulated to generate the keyboard and the mouse control instructions corresponding to the operating actions by using a keyboard-and-mouse automation program, so as to control the management server to automatically test the sensors in the server to be tested. By reading the database established in advance, the disclosure may further perform the actions such as comparing, capturing and storing the results from the tests executed by the management server, so as to accomplish effects of reducing testing costs while increasing usage of testing equipments.

To make the above features and advantages of the disclosure more comprehensible, several embodiments accompanied with drawings are described in detail as follows.

BRIEF DESCRIPTION OF THE DRAWINGS

FIGS. 5 to 7 are examples illustrating methods for generating the sensor configuration file according to an embodiment of the disclosure.

FIG. 10 illustrates the screen of the test result according to an embodiment of the disclosure.

DESCRIPTION OF THE EMBODIMENTS

In the disclosure, operating actions of a user operating an operating interface of a management program are simulated to generate corresponding keyboard and mouse control instructions. By means for controlling through the operating interface, the management program is controlled to automatically test sensors in a server to be tested, and operations such as comparing, capturing and storing parameters obtained by testing of the management program are automatically performed on the parameters obtained by the management program testing the sensors. With respect to the parameters obtained by testing of the management program, the disclosure further establishes data in advance in a database, which includes a name, a number, offsets, an event log, and an event severity, so that the data may be compared with test parameters to automatically determine a test result.

As a result, tasks that require the testing engineer to manually operate may be reduced, so as to accomplish effects of reducing testing costs while increasing usage of testing equipments.

Figure 1:
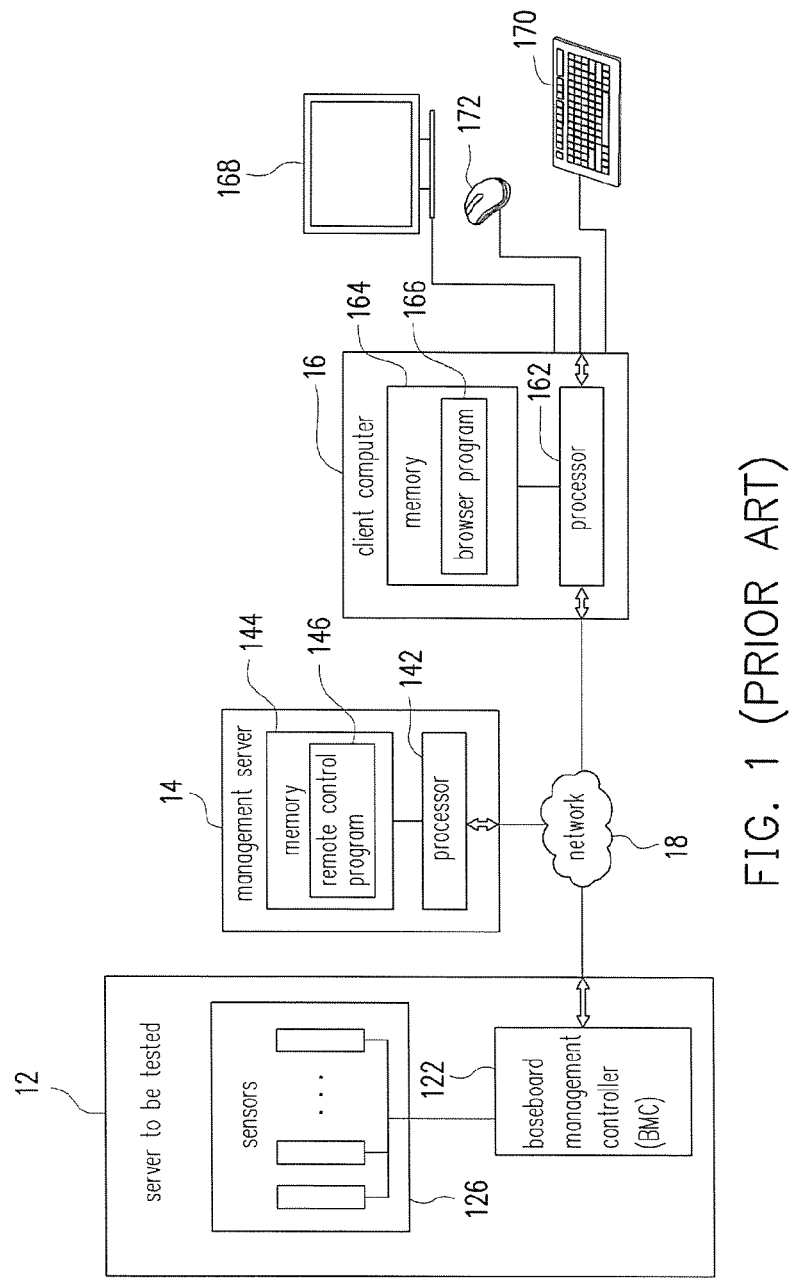
FIG. 1 is a schematic view of a conventional remote test system.
Figure 2:
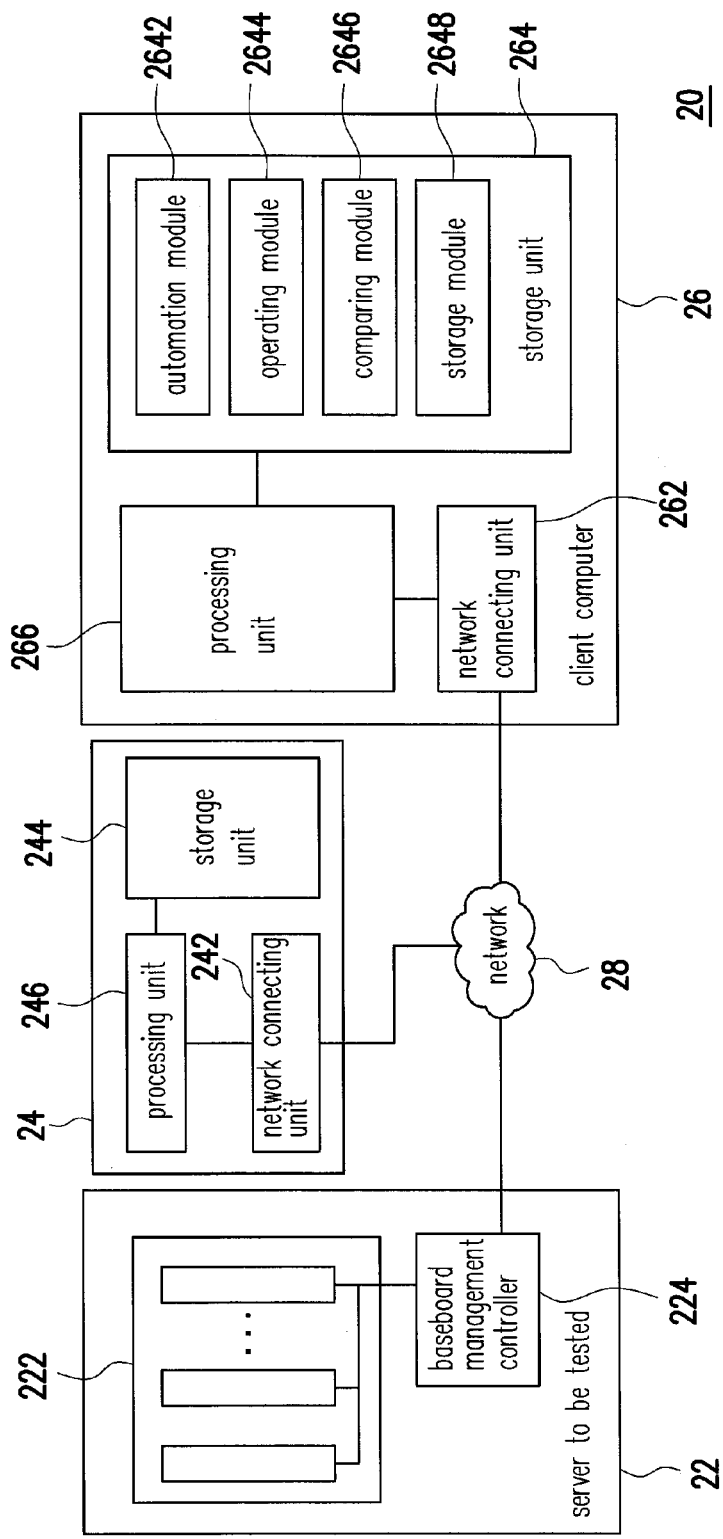
FIG. 2 is a block diagram illustrating a system for automated test and result comparison according to an embodiment of the disclosure.

FIG. 2 is a block diagram illustrating a system for automated test and result comparison according to an embodiment of the disclosure. Referring to FIG. 2, a system for automated test 20 includes a server to be tested 22, a management server 24 and a client computer 26 connected to each other through a network 28. Above-said devices may be electronic devices such as a desktop computer, a notebook computer, and a tablet computer, and have capabilities of basic network connection and computation in order to realize functions of automated test according to the present embodiment.

In the server to be tested 22, a plurality of sensors 222 are disposed on hardware components such as a central processing unit (CPU), a dual in-line memory module (DIMM), a fan, a power, or a driver. The server to be tested 22 further includes a baseboard management controller (BMC) 224. The baseboard management controller 224 is connected to each of the sensors 222 through, for example, an intelligent platform management bus (IPMB), so as to test each of the sensors 222 disposed in the server to be tested 22.

On the other hand, the management server 24 includes a network connecting unit 242, a storage unit 244 and a processing unit 246. The network connecting unit 242 is, for example, a wired network interface card or a wireless network interface card supporting communication protocols such as institute of electrical and electronics engineers (IEEE) 802.11b/g/n, and configured to connect the management server 24 to the baseboard management controller 224 of the server to be tested 22 through the network 28. The storage unit 244 is, for example, any forms of fixed or movable random access memory, read only memory, flash memory, hard disk or other similar devices, or a combination of above-said devices, so as to record the management program to be executed by the processing unit 246. The management program may be loaded and executed by the processing unit 246 to control the baseboard management controller 224 of the server to be tested 22 to test each of the sensors 222. The processing unit 246 is, for example, a CPU or other programmable devices for general purpose or special purpose such as a microprocessor, a digital signal processor (DSP), a programmable controller, an application specific integrated circuit (ASIC), a programmable logic device (PLD) or other similar devices or a combination of above-mentioned devices. The processing unit 246 is coupled to the network connecting unit 242 and the storage unit 244, and configured to access and execute the management program recorded in the storage unit 244 so as to control the baseboard management controller 224 of the server to be tested 22 to test each of the sensor 222.

The client computer 26 includes a network connecting unit 262, a storage unit 264 and a processing unit 266. The network connecting unit 262 is, for example, a wired network interface card or a wireless network interface card supporting communication protocols such as IEEE 802.11b/g/n, and configured to connect the client computer 26 to the network connecting unit 242 of the management server 24 through the network 28. The storage unit 264 is, for example, any forms of fixed or movable random access memory (RAM), read only memory (ROM), flash memory, hard disk or other similar devices, or a combination of above-said devices, so as to record modules to be executed by the processing unit 266. The modules may be loaded by the processing unit 266 to execute functions of automated test and result comparison. The processing unit 266 is, for example, a CPU or other programmable devices for general purpose or special purpose such as a microprocessor, a digital signal processor, a programmable controller, an application specific integrated circuit, a programmable logic device or other similar devices or a combination of above-mentioned devices. The processing unit 266 is coupled to the network connecting unit 262 and the storage unit 264, and configured to access and execute the modules recorded in the storage unit 264 to execute the functions of automated test and result comparison.

The modules recorded in the storage unit 264 include an automated module 2642, an operating module 2644, a comparing module 2646 and a storage module 2648. The modules are, for example, computer programs to be loaded by the processing unit 266 to execute the functions of automated test and result comparison. Detailed steps of executing the automated test by the system for automated test and result comparison 20 are as described in the following embodiments.

Figure 3:
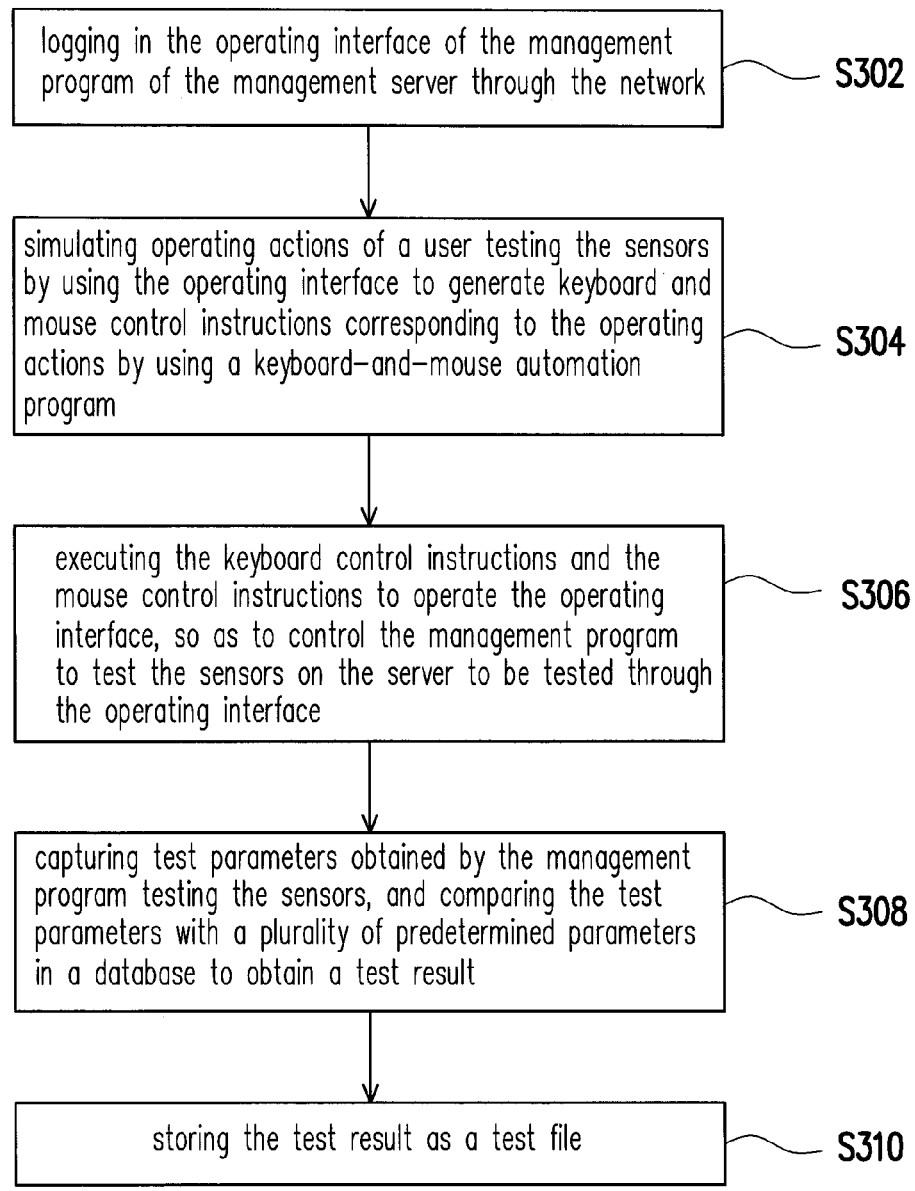
FIG. 3 is a flowchart illustrating a method for automated test and result comparison according to an embodiment of the disclosure.

FIG. 3 is a flowchart illustrating a method for automated test and result comparison according to an embodiment of the disclosure. Referring to FIG. 3, a method of the present embodiment is suitable for the system for automated test and result comparison 20 depicted in FIG. 2. Detailed steps of a method for automated test and result comparison are described below with reference to the system for automated test and result comparison 20.

First, the operating module 2644 logs in the operating interface of the management program of the management server 24 through the network 28 (step S302). The operating module 2644 may execute, for example, a web browser program (e.g., Internet Explorer, IE) to connect to a network established by the network connecting unit 262 and the network connecting unit 242, and log in the operating interface of the management program of the management server 24. The operating interface may be, for example, a web page of an integrated management module (IMM), but the disclosure is not limited thereto.

Next, the automated module 2642 simulates a plurality of operating actions of the user testing the sensors 222 in the server to be tested 22 by using the operating interface of the management program to generate a plurality of keyboard control instructions and a plurality of mouse control instructions corresponding to the operating actions by using a keyboard-and-mouse automation program (step S302). The management program is, for example, an ISD program installed on the management server 24, and the management program is provided to the management server 24 for testing the sensors 222 in the server to be tested 22. More specifically, once the management program is activated, operations such as "clear event log", "trigger event", and "get event log" may first be performed on the server to be tested 22. "Clear event log" refers to erasing of all of BMC event logs. "Trigger event" refers to generating of the BMC event logs physically, or by using an IPMI instruction. "Get event log" refers to reading of the BMC event logs by using a system management bridge (SMBridge). The event log indicates an event for testing one of the sensors, in which a log recording whether the sensor 222 passes the test is included.

For example, when the management program of the management server 24 is logged in by the client computer 26 through the network 28, the operating interface of the management program is displayed on a monitor (not illustrated) of the client computer 26. In this case, the automated module 2642 simulates the operating actions of the user operating the operating interface by using, for example, the keyboard-and-mouse automation program such as AutoIt. Manual operations of the user are replaced by the keyboard and mouse control instructions converted from the operating actions of the user controlling the management program by using the operating interface to test the sensors 222, such as mouse movements, mouse or keyboard inputs or a combination thereof.

Next, the operating module 2644 executes the keyboard control instructions and the mouse control instructions generated by the automated module 2642 to operate the operating interface, so as to control the management program to test the sensors 222 on the server to be tested 22 through the operating interface (step S304). The management program of the management server 24 uses an intelligent platform management interface (IPMI) utility program to transmit a series of intelligent platform management interface instructions to the baseboard management controller 224 of the server to be tested 22, so as to control the management program to test the sensors 222.

The management program obtains at least one test parameter after testing the sensors 222. In this case, the comparing module 266 captures the test parameter obtained by the management program testing the sensors 222, and comparing the test parameter with a plurality of predetermined parameters in a database to obtain a test result (step S306). The comparing module 266 compares, for example, the name, the number, the offset, the event log, the event severity in the test parameter with the predetermined parameters corresponding to the test parameter in a database, so as to determine whether the sensor 222 is abnormal.

It should be noted that, in an embodiment, the comparing module 266 may directly request the management program for obtaining the test parameter. In another embodiment, the comparing module 266 may capture texts displayed by the operating interface of the management program. The comparing module 266 cannot directly capture the test parameter in the web page because the texts in the web page are complied in Java language. Accordingly, the comparing module 266 may capture the texts on a screen of the test parameter displayed by the operating interface through, for example, a parameter capturing module (not illustrated). The texts are then pasted to a text editor such as Notes, so that subsequent comparing processes may be performed to obtain the required test parameter such as an event name, and an event severity.

Lastly, the storage module 268 stores a test result obtained by the comparing module 266 as a test file (step S308). The storage unit 268 stores the required texts in the sensor event and the corresponding test result in a spreadsheet for the testing engineer to review.

Based on above method, the system for automated test and result comparison 20 may automatically generate and record the test result. Therefore, besides that the operating actions of the testing engineer using the management program to test the sensors may be reduced, a time wasted by the testing engineer when manually comparing the parameters such as sensor event and severity as well as a probability for errors to occur may both be reduced.

It should be noted that, according to an embodiment, in the client computer, the system for automated test and result comparison may also establish databases corresponding to important parameters such as the event log and the event severity in advance, which may be used for comparing the test parameters. Further, when the test result is stored in the client computer, besides the test parameters and the test results, the screen displayed by the operating interface of the management program after testing the sensors may also be stored, so that the testing engineer may review details for testing the sensors in the future. Another embodiment is given for illustration below.

Figure 4:
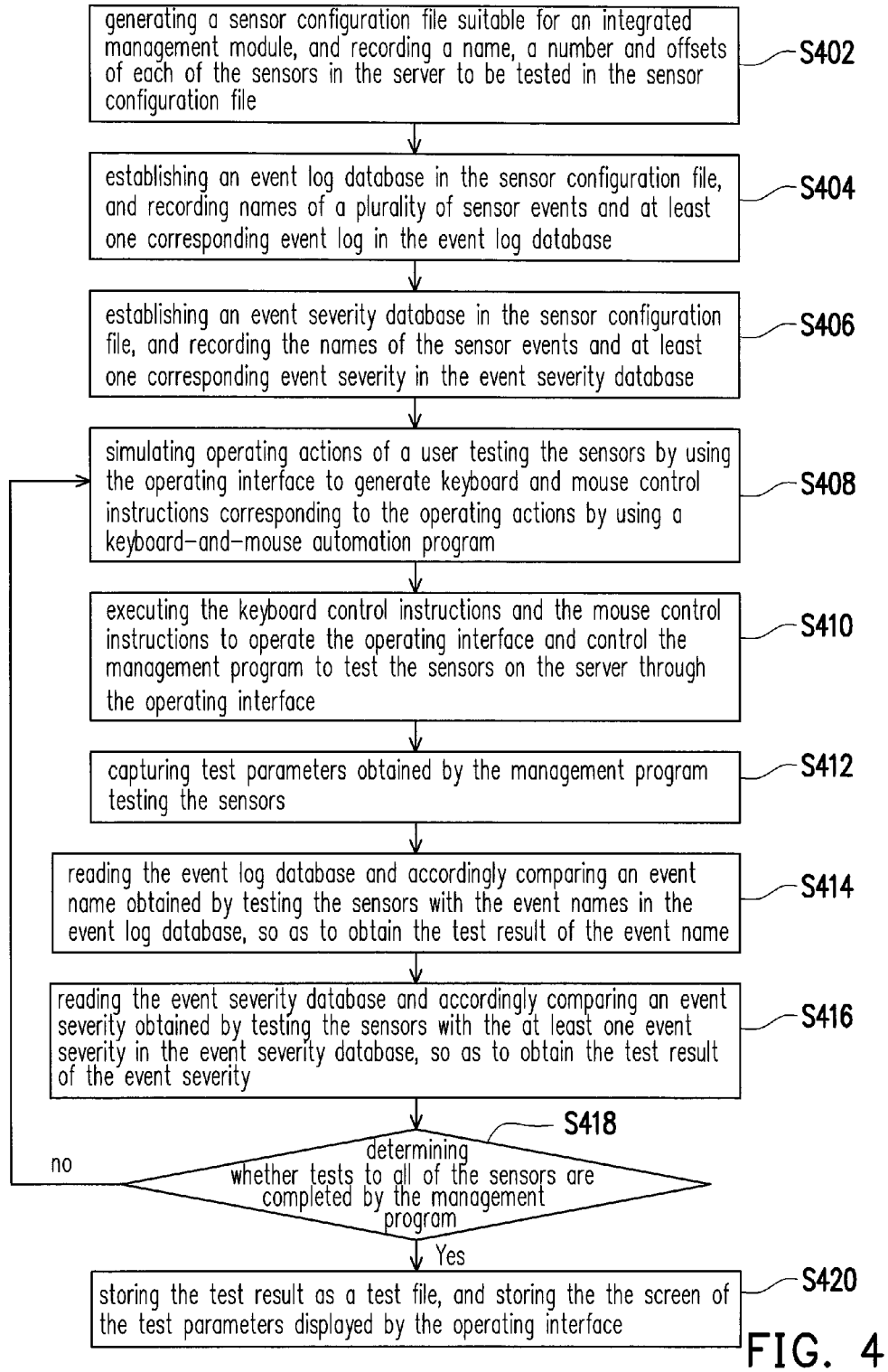
FIG. 4 is a flowchart illustrating a method for automated test and result comparison according to an embodiment of the disclosure.

FIG. 4 is a flowchart illustrating a method for automated test and result comparison according to an embodiment of the disclosure. Referring to FIG. 4, a method of the present embodiment is suitable for the system for automated test and result comparison 20 depicted in FIG. 2. Detailed steps of a method for automated test and result comparison are described below with reference to the system for automated test and result comparison 20.

First, a configuration file generating module (not illustrated) generates a sensor configuration file suitable for an integrated management module, in which a name, a number and offsets of each of the sensors 222 in the server to be tested 22 are recorded in the sensor configuration file (step S402). Next, the configuration file generating module establishes an event log database in the sensor configuration file, and the event log database records names of a plurality of sensor events and at least one corresponding event log (step S404). The configuration file generating module also establishes an event severity database in the sensor configuration file, and the event severity database records the names of the sensor events and at least one corresponding event severity (step S406).

For instance, FIGS. 5 to 7 are examples illustrating methods for generating the sensor configuration file according to an embodiment of the disclosure. In the present embodiment, based on inputs from the user, the client computer records the name DIMM 1, the number 0xB0 and the offsets Offset 00, Offset 10 and Offset 08 of the sensor in the sensor configuration file of the integrated management module (as shown in FIG. 5). Subsequently, the client computer further establishes the event log database in the sensor configuration file, and records the name DIMM 1 of the sensor and the at least one corresponding event log in the event log database (as shown in FIG. 6). For example, the event log includes a multi-bit error (MBE) assertion, a scrub failure assertion, and a single bit error (SBE) assertion. Furthermore, the client computer further establishes the event severity database in the sensor configuration file, and records the event logs of the name DIMM 1 of the sensor (e.g. the MBE assertion, the scrub failure assertion, and the SBE assertion) and the at least one corresponding event severity (e.g. critical, warning, and minor) in the event log database (as shown in FIG. 7).

Referring back to the flow depicted in FIG. 4, after the sensor configuration file is generated, the automated module 2642 simulates a plurality of operating actions of the user testing the sensors 222 in the server to be tested 22 by using the operating interface of the management program to generate a plurality of keyboard control instructions and a plurality of mouse control instructions corresponding to the operating actions by using a keyboard-and-mouse automation program (step S408). Next, the operating module 2644 executes the keyboard control instructions and the mouse control instructions generated by the automated module 2642 to operate the operating interface, so as to control the management program to test the sensors 222 in the server to be tested 22 through the operating interface (step S410). Since steps S408 to S410 in the present embodiment are the same as or similar to steps S302 to S304 in the foregoing embodiment, they will not be described again hereinafter.

Thereafter, the comparing module 2646 captures the test parameter obtained by the management program testing the sensors 222 (step S412). The comparing module 2646 may capture the texts on a screen of the test parameter displayed by the operating interface through, for example, the parameter capturing module (not illustrated), so as to obtain the test parameters such as the event name and the event severity. The screen captured by the parameter capturing module includes an event list having a plurality of test events to be executed by the management program to the sensors 222, and the test parameter obtained by executing each of the test events.

Figure 8:
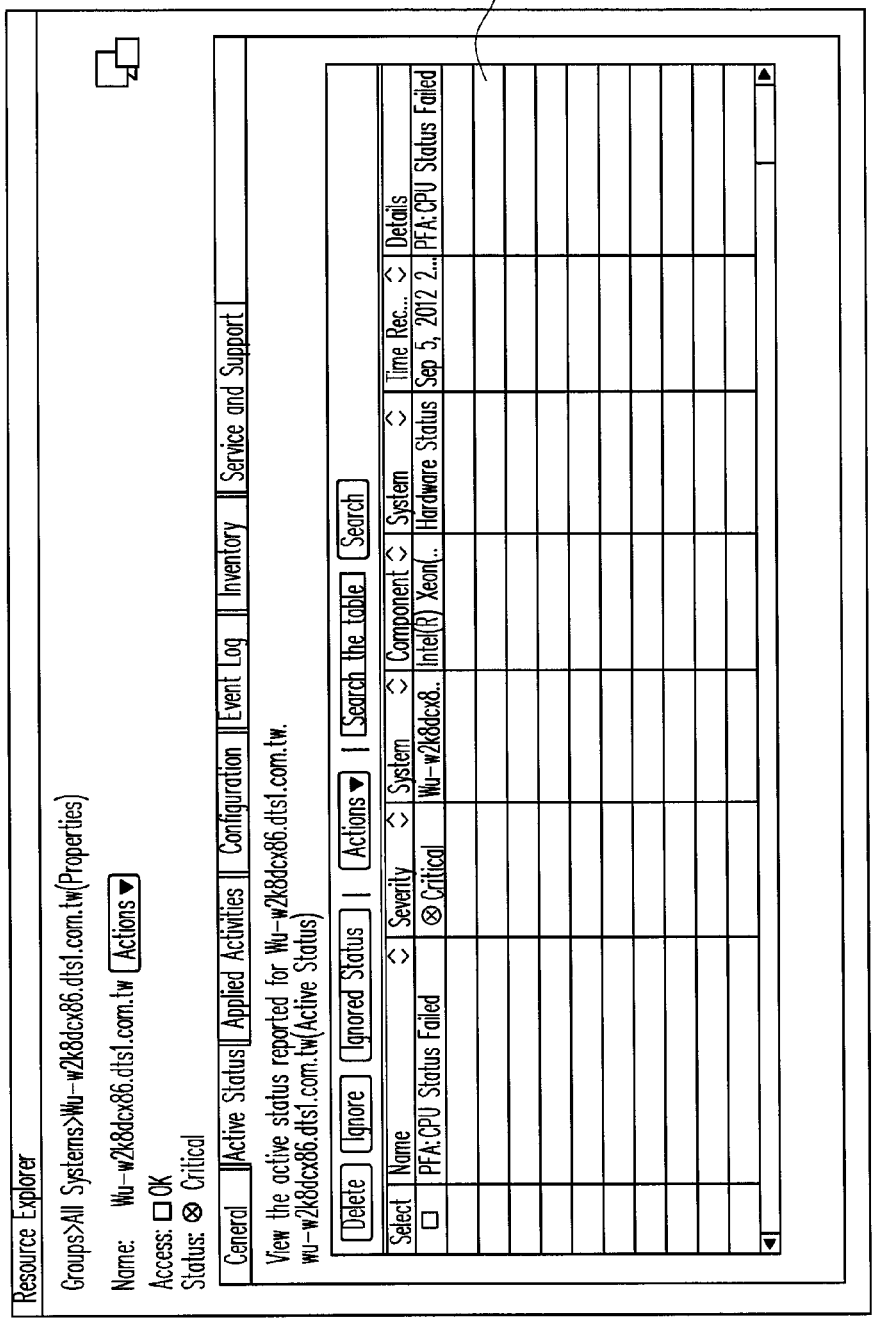
FIGS. 8 and 9 illustrate the operating interface according to an embodiment of the disclosure.
Figure 9:
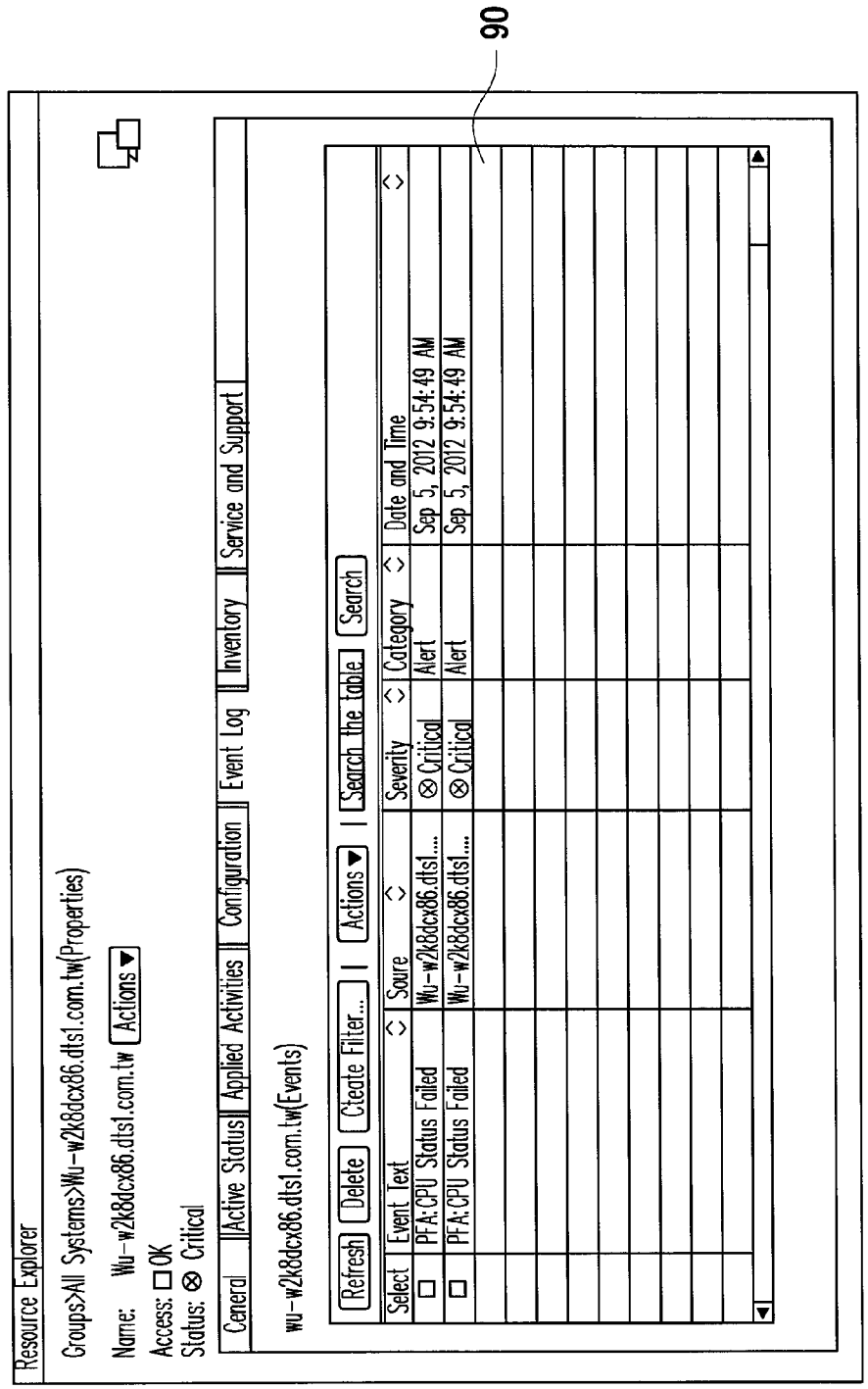

For instance, FIGS. 8 and 9 illustrate the operating interface according to an embodiment of the disclosure. In the present embodiment, the client computer may, for example, capture the screen of an active status page 80 displayed by the operating interface of management program (as shown in FIG. 8), in which a detailed testing content regarding a CPU failure event generated by testing the CPU is included. Furthermore, the client computer may, for example, capture the screen of an event log page 90 displayed by the operating interface of management program (as shown in FIG. 9), in which the event log regarding the CPU failure event is included.

On the other hand, after the test parameter is captured, the comparing module 2646 may, for example, read the event log database and accordingly compares the event name obtained by testing the sensor 222 with the event names in the event log database, so as to obtain the test result of the event name (step S414). Furthermore, the comparing module 2646 also reads the event severity database and accordingly compares an event severity obtained by testing the sensor 222 with the at least one event severity in the event severity database, so as to obtain the test result of the event severity (step S416).

Lastly, the storage module 2648 may determine whether tests to all of the sensors 222 are completed by the management program (step S418). In case the tests to any of the sensor 222 are not completed, the procedure is returned back to step S408 for testing the next one of the sensors 222. Otherwise, when the storage module 2648 determines that the tests are completed for all of the sensors 222, the test result obtained by the comparing module 2646 is stored as the test file. Meanwhile, the screen of the test parameter displayed by the operating interface and captured by the parameter capturing module is also stored (step S420) and provided to the testing engineer for reviewing. The storage unit 268 stores the required texts in the sensor event and the corresponding test result in a spreadsheet for the testing engineer to review.

Figure 10:
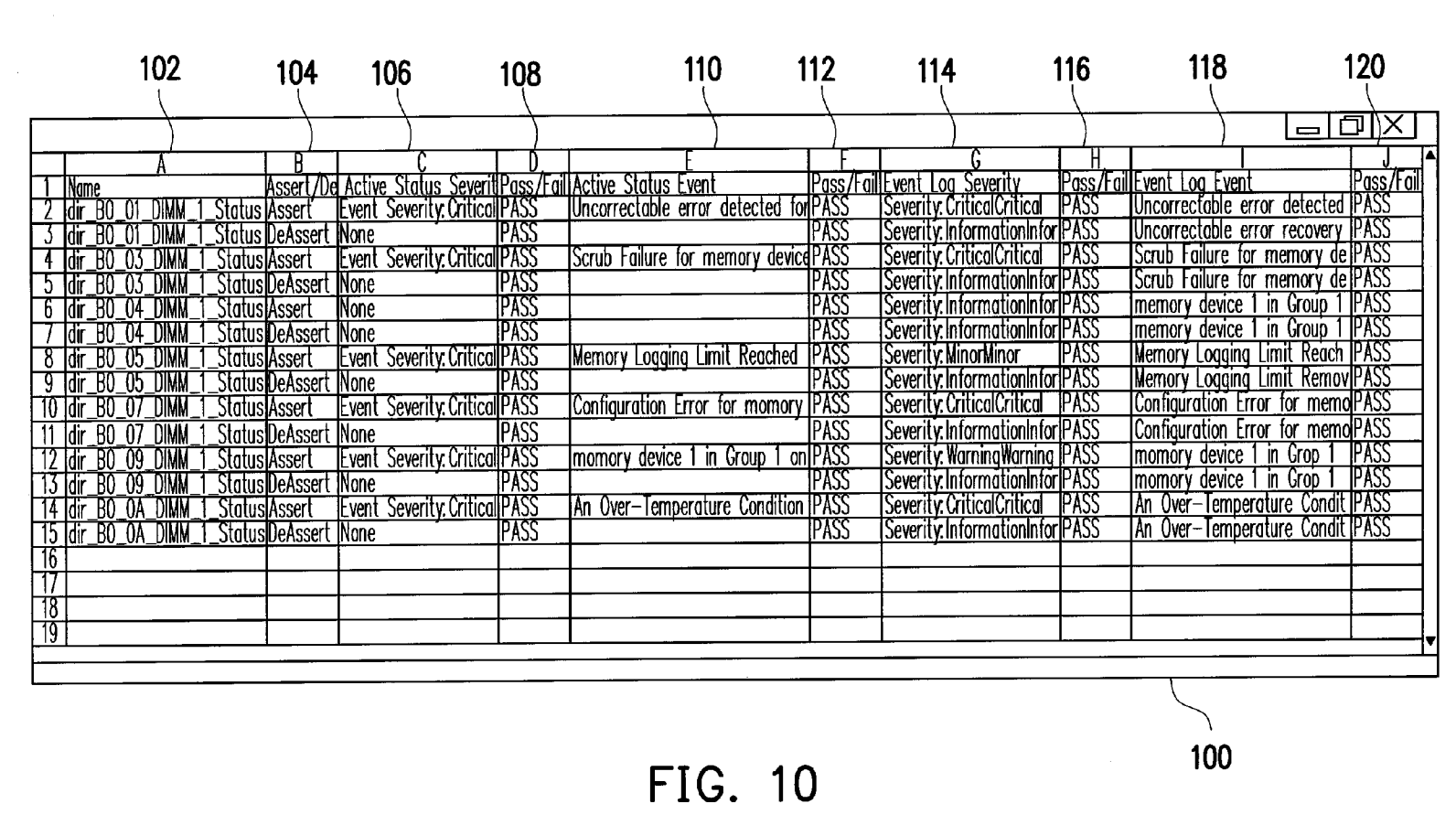

For instance, FIG. 10 illustrates the screen of the test result according to an embodiment of the disclosure. In the present embodiment, the client computer 26 integrates the test results generated by the comparing module 2646 from comparing the event log and the event severity, respectively. The required texts and the corresponding test result in each of the sensor events are stored into a test result spreadsheet 100. The test result spreadsheet 100 includes fields such as a sensor name 102, an assertion result 104, an active status severity 106 together with whether it is pass/fail 108, an active status event 110 together with whether it is pass/fail 112, an event log severity 114 together with whether it is pass/fail 116, and an event log event 118 together with whether it is pass/fail 120.

Based on above method, the system for automated test and result comparison 20 may automatically generate and record the test result. The screen of the test parameter displayed by the operating interface may then be captured, stored, for the testing engineer to review, thereby reducing testing costs.

In summary, in the system and the method for automated test and result comparison according to the disclosure, the operating actions of the user operating the operating interface of the management program is automated, and the actions such as comparing, capturing, storing the test result are performed on the test result, so that the actions of testing repeatedly and manually performed by the testing engineer may be reduced, and the errors occurred due to manual comparison may also be reduced. As a result, automated process may reduce the time spent by the testing engineer in front of equipment, and the server may be tested constantly, so as to accomplish effects of reducing testing costs while increasing usage of testing equipments.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A method for test and result comparison, implemented in a client computer to control a management server to test a plurality of sensors in a server to be tested, wherein the client computer, the management server and the server to be tested are connected to each other through a network, and the method comprises:

generating a sensor configuration file suitable for an integrated management module (IMM), wherein a name, a number and offsets of each of the sensors in the server to be tested are recorded in the sensor configuration file;

establishing an event log database in the sensor configuration file, wherein the event log database records names of a plurality of sensor events and at least one corresponding event log;

establishing an event severity database in the sensor configuration file, wherein the event severity database records the names of the sensor events and at least one corresponding event severity;

logging in an operating interface of a management program of the management server through the network;

simulating a plurality of operating actions of a user testing one of the sensors on the server to be tested by using the operating interface to generate a plurality of keyboard control instructions and a plurality of mouse control instructions corresponding to the operating actions by using a keyboard-and-mouse automation program;

executing the keyboard control instructions and the mouse control instructions to operate the operating interface, so as to control the management program to test the sensors through the operating interface;

capturing at least one test parameter obtained by the management program testing the sensors, and comparing the test parameter with a plurality of predetermined parameters in a database to obtain a test result, comprising:

reading the event log database and accordingly comparing an event name obtained by testing the sensor with the event names in the event log database, so as to obtain the test result of the event name; and reading the event severity database and accordingly comparing the event severity obtained by testing the sensor with the at least one event severity in the event severity database, so as to obtain the test result of the event severity; and storing the test result as a test file.

2. The method claim 1, wherein the step of capturing the test parameter obtained by the management program testing the sensors comprises:

capturing a plurality of texts on a screen of the test parameter displayed by the operating interface to obtain the test parameter.

3. The method of claim 2, wherein the screen captured includes an event list having a plurality of test events to be executed by the management program to the sensors, and the test parameter obtained by executing each of the test events.

4. The method of claim 2, wherein the step of storing the test result as the test file comprises:

storing the screen of the test parameter displayed by the operating interface.

5. The method of claim 1, wherein after storing the test result as the test file, further comprising:

repeating all steps above to test a rest of the sensors among the sensors, so as to obtain the test result of each of the sensors and store the test result to the test file.

6. A system for test and result comparison, comprising:

a server to be tested, comprising:
    a plurality of sensors; and
    a baseboard management controller coupled to the sensors;
  a management server, comprising:
    a first network connecting unit configured to connect the baseboard management controller of the server to be tested through a network;
    a first storage unit configured to store a management program; and
    a first processing unit coupled to the first network connecting unit and the first storage unit, and configured to load and execute the management program; and
  a client computer comprising:
    a second network connecting unit configured to connect the first networking connecting unit of the management server through the network;
    a second storage unit configured to store a plurality of modules; and
    a second processing unit coupled to the second network connecting unit and the second storage unit, configured to load and execute the modules stored in the second storage unit, and the modules comprise:
      a configuration file generating module, generating a sensor configuration file suitable for an integrated management module, wherein a name, a number and offsets of each of the sensors in the server to be tested are recorded in the sensor configuration file, and wherein the sensor configuration file further comprises an event log database for recording names of a plurality of sensor events and at least one corresponding event log, and an event severity database for recording the names of the sensor events and at least one corresponding event severity;
      an automated module, simulating a plurality of operating actions of a user testing one of the sensors in the server to be tested by using an operating interface of the management program to generate a plurality of keyboard control instructions and a plurality of mouse control instructions corresponding to the operating actions by using a keyboard-and-mouse automation program;
      an operating module, logging in the operating interface through the network, and executing the keyboard control instructions and the mouse control instructions to operate the operating interface, so as to control the management program to test the sensors;
      a comparing module, capturing at least one test parameter obtained by the management program testing the sensors, and comparing the test parameter with a plurality of predetermined parameters in a database to obtain a test result, wherein the comparing module reads the event log database and accordingly compares an event name obtained by testing the sensor with the event names in the event log database, so as to obtain the test result of the event name; and the comparing module reads the event severity database and accordingly compares the event severity obtained by testing the sensor with the at least one event severity in the event severity database, so as to obtain the test result of the event severity; and
      a storage module, storing the test result as a test file.

7. The system of claim 6, wherein the comparing module comprises:

a parameter capturing module, capturing a plurality of texts on a screen of the test parameter displayed by the operating interface to obtain the test parameter.

8. The system of claim 7, wherein the screen captured includes an event list having a plurality of test events to be executed by the management program to the sensors, and the test parameter obtained by executing each of the test events.

9. The system of claim 7, wherein the storage module further stores the screen of the test parameter displayed by the operating interface.

* * * * *